Figure 1:
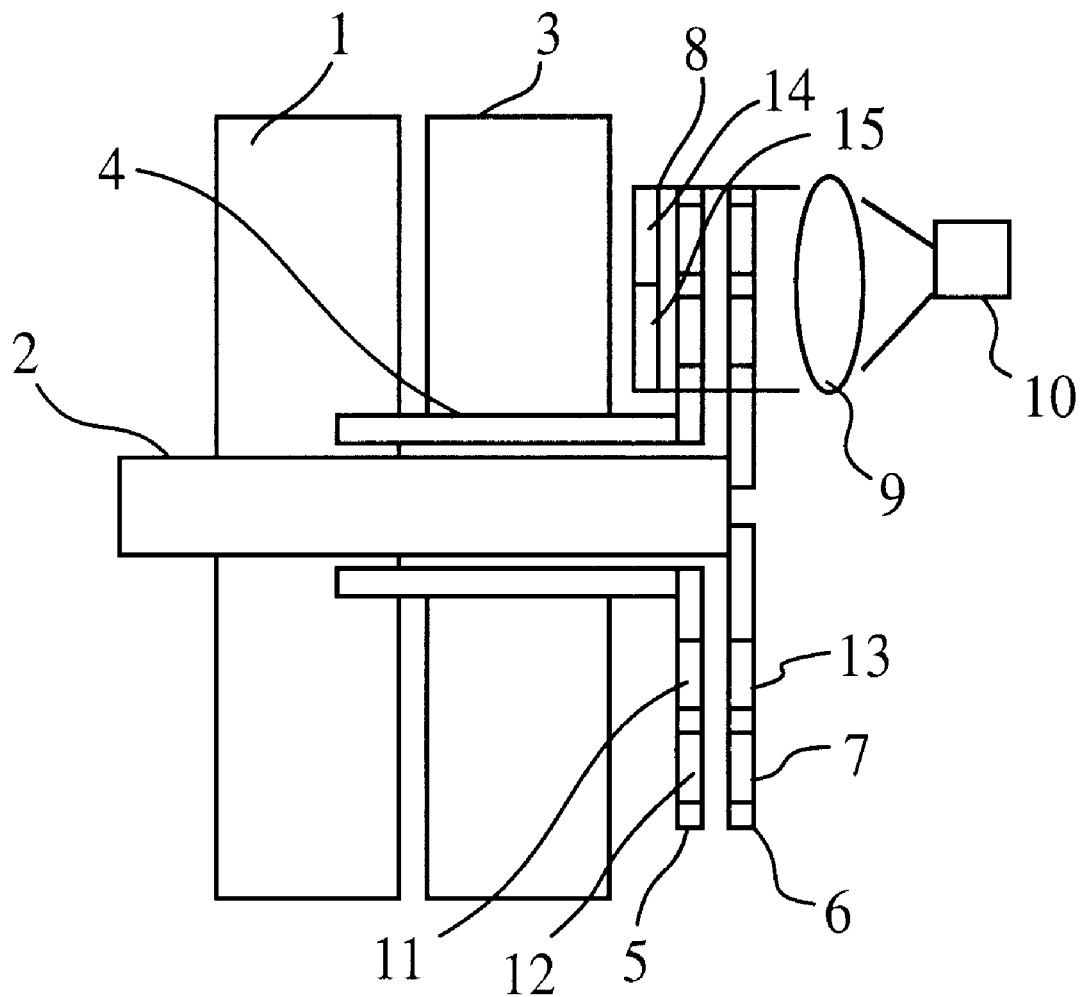

United States Patent [19]
Siraky

[11] Patent Number: 5,932,980
[45] Date of Patent: Aug. 3, 1999

[54] METHOD AND DEVICE FOR CONTROLLING THE ROTATION SPEED OF AN OUTPUT SHAFT

[75] Inventor: Josef Siraky, Donaueschingen, Germany

[73] Assignee: Max Stegmann GmbH Antriebstechnik-Elektronik, Donaueschingen, Germany

[21] Appl. No.: 09/017,668

[22] Filed: Feb. 3, 1998

[30] Foreign Application Priority Data

Feb. 10, 1997 [DE] Germany ............................ 197 04 939

[51] Int. Cl.⁶ ........................................................ H02P 5/00
[52] U.S. Cl. ............................ 318/268; 318/15; 318/558
[58] Field of Search .................................. 318/9, 11, 15, 318/268, 558, 618

[56] References Cited

U.S. PATENT DOCUMENTS 3,712,153  1/1973  East et al. ................................. 74/687
3,796,898  3/1974  Kleinwaechter ......................... 310/103
3,929,292  12/1975  Phillips ................................... 239/685
5,828,136  10/1998  Yang ...................................... 290/4 A

*Primary Examiner*—Bentsu Ro
*Attorney, Agent, or Firm*—Nath & Associates; Gary M. Nath

[57] ABSTRACT

In order to control the rotation speed of an output shaft (2) driven by an electric motor (3) by means of a gear mechanism (1), the difference of the rotation speeds of the motor shaft (4) of the electric motor (3) and of the output shaft (2) is measured by means of an incremental torque meter (5, 6, 8, 9, 10) as an actual value and is used in a control circuit for controlling the electric motor (3) in order to level deviations of the rotation speed of the output shaft (2) from a specified desired value.

8 Claims, 1 Drawing Sheet

METHOD AND DEVICE FOR CONTROLLING THE ROTATION SPEED OF AN OUTPUT SHAFT

The invention relates to a method and a device for controlling the rotation speed of an output shaft driven by an electric motor by means of a gear mechanism according to the preamble of claim 1 and claim 4 respectively.

In any application, in particular in the case of servo drives, it is necessary that the rotation speed of a shaft driven by an electric motor is controlled in accordance with a specified desired value, e.g., to control the synchronization of the shaft. For this purpose, a tachometer measuring the rotation speed of the motor shaft is commonly installed on the motor shaft of the electric motor. By using this rotation speed information, any deviations by the motor shaft rotation speed from a specified desired value are hereby leveled in a control circuit by appropriately controlling the power supply to the electric motor. The tachometer hereby is frequently an incremental torque meter which forms the rotation speed information in digital form as rectangular pulses, or, in analog form, as sine and cosine signals.

In practice, the electric motor is followed in most cases by a mechanical gear mechanism, so that the rotation speed of the output shaft of the gearing is important for the application. As a rule, mechanical gear mechanisms have a certain non-linearity during rotation speed transfer. The control of the motor shaft of the electric motor therefore only achieves an insufficient output shaft rotation speed control. This shortcoming can only be minimized by very complex gear mechanisms.

The invention is based on the task of providing a method and a device for controlling the rotation speed of an output shaft driven by an electric motor by means of a gear mechanism, which enables a high quality of rotation speed control of the output shaft with low expenditure, and, in particular, low requirements for the gear mechanism.

According to the invention, this task is realized by a method with the characteristics of claim 1, or by a device with the characteristics of claim 4.

Advantageous embodiments of the invention are stated in the dependent sub-claims.

The basic idea of the invention is to use, for rotation speed control, the rotation speed of the output shaft of the gear mechanism, in order to control the electric motor. As a result, the non-linearities of the rotation speed transfer function of the mechanical gear mechanism are included in the consideration during the control, so that no high requirements must be posed on linearity and precision of the mechanical gear mechanism. Even with a cost-efficient, mechanical gear mechanism with low linearity, it is possible to control the rotation speed of the output shaft with high precision.

In order to keep the expenditures for the rotation speed control low, the difference between the rotation speed of the motor shaft of the electric motor and the output shaft of the gear mechanism is measured as the actual value. Because of this, a single sensor for determining both the actual value of the control value, i.e., the rotation speed of the output shaft, as well as the angle position of the motor shaft, i.e., the rotor position of the motor for commutation, is sufficient. Because of this, the expenditure for the torque meter as an actual value sensor is therefore not greater than for normal controlling systems.

It is preferred that the difference of the rotation speeds of the motor shaft and the output shaft is determined with an incremental torque meter whose relative rotation is measured. The relative rotation of the incremental torque meter, e.g., of two optically scanned bar code disks, provides a signal which corresponds to the difference between the motor shaft rotation speed and output shaft rotation speed. The output shaft rotation speed equals the motor shaft rotation speed multiplied by the reduction ratio of the gear mechanism, whereby this reduction ratio includes the undefined non-linearities of the gear transfer function. Since the gear mechanisms commonly used have a reduction ratio of at least one magnitude, this results in a differential signal whose frequency is in the magnitude of the motor shaft rotation speed, but which includes the non-linearities of the mechanical gear mechanism.

A mechanically simple construction of the device is obtained when the electric motor and the gear mechanism are built in relation to each other so as to be axially aligned, whereby the motor shaft and the output shaft are set inside each other coaxially. It is preferred that the gear mechanism is attached to one axial end of the motor, and the actual value sensor at the other axial end of the electric motor, whereby the motor shaft is constructed as a hollow shaft, and the output shaft coaxially passes through the motor shaft. This results in a compact structural unit which can be installed, for example, as a complete servo drive.

The torque meter connected to the motor shaft is, in addition, scanned separately for generating a signal which corresponds to the angle position of the rotor of the electric motor and can be used for the power supply to or commutation of the electric motor.

The following describes the invention in more detail in reference to the embodiment shown in the drawing. The only FIGURE shows a schematic axial section of the device for controlling the rotation speed.

An electric motor 3 drives with its motor shaft 4 a gearing mechanism 1 which is attached axially aligned to the frontal face of the motor 3. The output shaft 2 of the mechanical gearing mechanism 1 projects from the front attachment face of the gearing mechanism 1 and functions as servo drive shaft. The motor shaft 4 is constructed as a hollow shaft. The output shaft 2 of the gearing mechanism is extended backward and passes coaxially through the motor shaft 4. Both the motor shaft 4 and the output shaft 2 project beyond the rear face of the electric motor 3.

On the rear end of the motor shaft 4 is positioned a first incremental angle measuring object constructed as a bar-code disk 5. A second incremental angle measuring object, which is constructed as bar-code disk 6, is positioned on the end of output shaft 2 which projects beyond the motor shaft 4. The two bar-code disks 5 and 6 are arranged coaxially and at an axial distance from each other.

The first bar-code disk 5 connected with the motor shaft 4 carries an inner code track 11 and an outer incremental track 12 arranged concentrically to each other. The code track 11 contains, for example, digitally absolute information analog to the pole number of the electric motor 3, or a sine/cosine information per revolution. The second bar-code disk 6 connected to the output shaft 2 carries an outer incremental track 7 which is arranged so as to cover the outer incremental track 12 of the first bar-code disk 5, and a concentric inner, transparent track area 13 which is arranged so as to cover the inner code track 11 of the first bar-code disk 5.

A scanning device arranged in a fixed manner in relation to the housing of the electric motor 3 scans the tracks of bar-code disks 5 and 6. The scanning device consists of a light source 10, a lens 9 which bundles the light of the light source in a parallel manner and guides it through bar-code disks 5 and 6 and a photoreceptor 8. The photoreceptor 8 has an outer receiver section 14 and an inner receiver section 15. The outer receiver section 14 responds to the light passing through the outer incremental tracks 7 and 12, while the inner receiver section 15 responds to the light passing through the transparent track area 13 and the inner code track 11.

When the electric motor 3 is running, the first bar-code disk 5 revolves with the rotation speed of the motor shaft 4, while the second bar-code disk 6 revolves with the rotation speed of the output shaft 2 of the gear mechanism. The inner receiver section 15 of the photoreceptor 8 receives a light signal which is determined by the inner code track 11 of the first bar-code disk 5. The corresponding electric output signal generated by the inner receiver section 15 is used to determine the angle position of the motor shaft 4, and thus of the rotor of the electric motor 3 for the purpose of its power supply and commutation.

The outer receiver section 14 of the photoreceptor 8 receives a light signal which is modulated according to the difference of the rotation speeds at which the incremental tracks 12 and 7 of the first bar-code disk 5 or of the second bar-code disk 6 are revolving. If the gear mechanism 1—as is the case in most applications—is a reduction gear mechanism, the second bar-code disk 6 revolves significantly slower than the first bar-code disk 5. The electric output signal generated by the outer receiver section 14 is accordingly a sine-shaped signal whose frequency is determined essentially by the outer incremental track 12 of the first bar-code disk 5, but is reduced in accordance with the rotation speed of the incremental track 7 of the second bar-code disk 6. Since during the rotation of the second bar-code disk 6 the non-linearities of the transfer function of the gear mechanism 1 do have an effect, the signal of the outer receiver section 14 also shows the deviations caused by the non-linearities of the gear mechanism 1. The electric output signal of the outer receiver section 14 is used for controlling the power supply to the electric motor 3 and to level the deviations of the rotation speed of the output shaft 2 from a specified desired value.

I claim:

1. Method for controlling the rotation speed of an output shaft driven by an electric motor by means of a gearing mechanism, whereby an actual value of the rotation speed is measured, and the electric motor is controlled in accordance with the deviation of the actual value from a desired value of the rotation speed, characterized in that the difference of the rotation speeds of the motor shaft of the electric motor and of the output shaft of the gearing mechanism is measured as the actual value.

2. Method as claimed in claim 1, characterized in that the rotation speed of the motor shaft and the rotation speed of the output shaft are measured by means of incremental torque meters and are scanned together in order to form a signal corresponding to their relative revolution as the actual value.

3. Method as claimed in claim 2, characterized in that the incremental torque meter of the motor shaft is also associated with a separately scanned angle information in order to generate a signal that determines the rotor position of the electric motor.

4. Device for controlling the rotation speed of an output shaft driven by an electric motor by means of a gear mechanism, with a control circuit that controls a torque meter as the actual value sensor, and which controls the electric motor in accordance with the control deviation of the actual value from the desired value, characterized in that the torque meter has a first incremental angle measuring object (5) driven by the motor shaft (4), and a second incremental angle measuring object (6) driven by the output shaft (2), that a scanning device (8, 9, 10) scans both the first and the second angle measuring object (5, 6) and generates a signal corresponding to the difference of the rotation speeds of the first and the second angle measuring objects (5, 6) as an actual value for the control circuit.

5. Device as claimed in claim 4, characterized in that the first and second angle measuring object (5, 6) are arranged coaxially.

6. Device as claimed in claim 5, characterized in that the electric motor (3) and the gear mechanism (1) are arranged axially aligned with each other, and that the motor shaft (4) or the output shaft (2) is constructed as a hollow shaft, and that, respectively, the other of these two shafts (2 or 4) passes through it.

7. Device as claimed in claim 4, characterized in that the first and second angle measuring object (5, 6) are optically scannable bar-code disks.

8. Device as claimed in claim 4, characterized in that the first incremental measuring object (5) is connected with another code track (11) which has a separate scanning device (9, 10, 15) which generates a signal recording the angle position of the motor shaft (4).

* * * * *